(12) United States Patent
Reed

(10) Patent No.: US 6,382,893 B1
(45) Date of Patent: May 7, 2002

(54) THREAD REPLACEMENT SYSTEM AND DEVICE

(76) Inventor: Gary J. Reed, 1015 S. Soderquist Rd., Turlock, CA (US) 95380

(*) Notice: Subject to any disclaimer, the term of this patent is extended or adjusted under 35 U.S.C. 154(b) by 0 days.

(21) Appl. No.: 09/592,118

(22) Filed: Jun. 12, 2000

(51) Int. Cl.[7] .......................... F16B 37/12; F16B 39/30
(52) U.S. Cl. ................. 411/178; 411/109; 411/187; 411/309
(58) Field of Search .................. 411/178, 109, 411/3–5, 309, 310, 311, 108, 187, 354; 29/525.11

(56) References Cited

U.S. PATENT DOCUMENTS

| | | | |
|---|---|---|---|
| 5,379,505 A | * | 1/1995 | Reed .............................. 411/5 |
| 5,435,678 A | * | 7/1995 | Stencel .................. 411/109 X |
| 5,499,892 A | | 3/1996 | Reed |

* cited by examiner

Primary Examiner—Neill Wilson
(74) Attorney, Agent, or Firm—Bernhard Kreten

(57) ABSTRACT

The present invention relates to a system and device which allows the replacement of a damaged thread in an object with a thread identical to the damaged thread by enlarging the original threaded hole and inserting a thread-insert in a newly threaded hole in the object which has an internally threaded hole identical to the original threaded hole. The thread-insert is fastened into the enlarged hole using a thread that securely holds it in place. When the thread-insert is threaded into the enlarged threaded hole, a pocket formed below the drive head of the thread-insert causes metal flow into the pocket to create a seal between the thread-insert and the object.

33 Claims, 5 Drawing Sheets

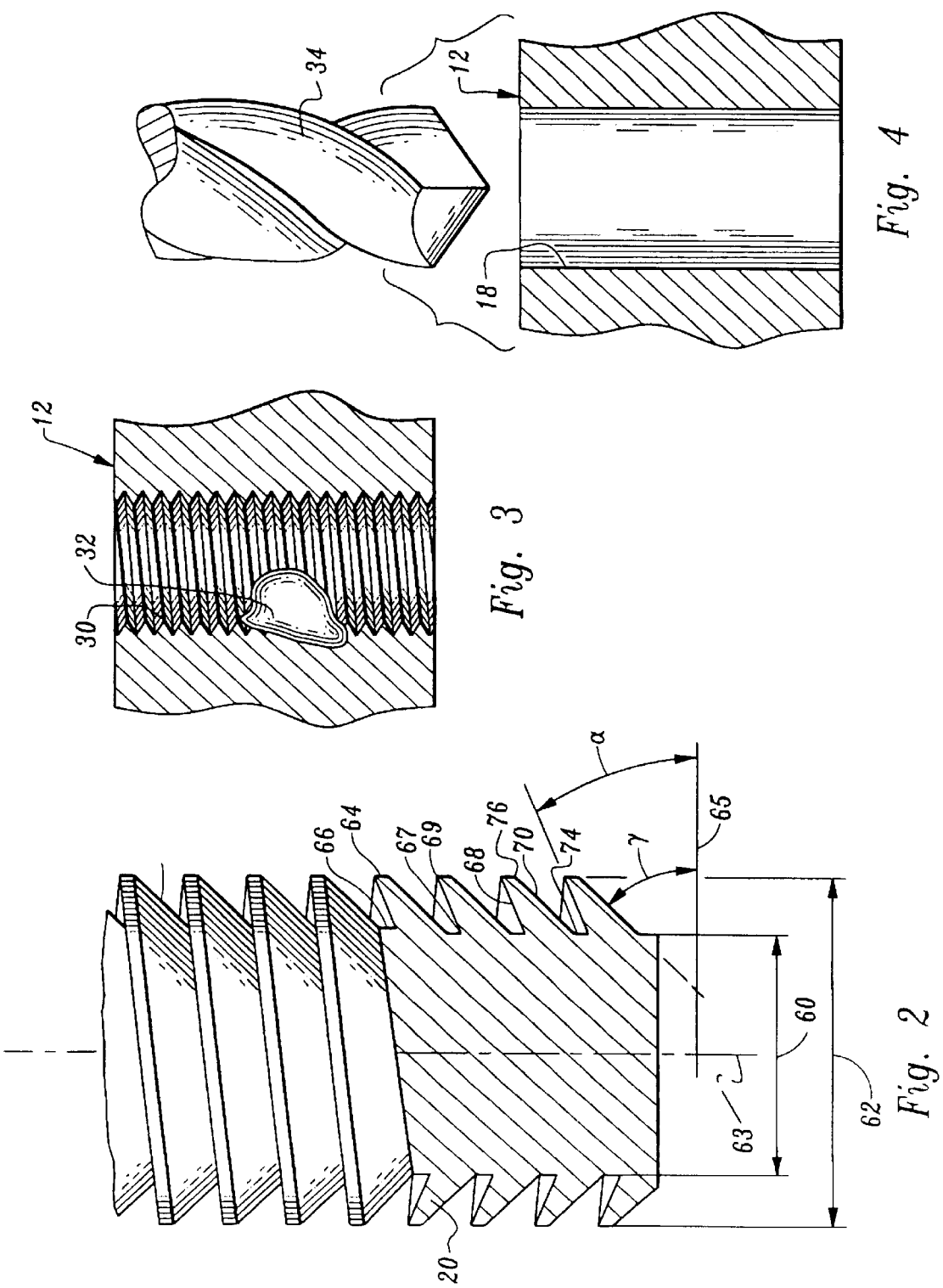

THREAD REPLACEMENT SYSTEM AND DEVICE

FIELD OF THE INVENTION

The following invention relates generally to a system and device for replacing damaged screw threads in an object, and in particular to a system and device for replacing damaged screw threads which will replace the threads with a permanently installed insert, the insert also provides a seal between the insert and the object to be repaired.

BACKGROUND OF THE INVENTION

When internal screw threads cut into an object become damaged, they can sometimes be repaired by chasing the damaged thread with a tap to restore the thread shape. However, if the thread is damaged to such an extent that chasing with a tap will not restore its function, the thread must be replaced. This can be done by boring out the original threads with a drill larger than the major diameter of the thread and rethreading the hole with a larger diameter thread. While this method will provide a usable threaded hole, it will require a fastener of a different size than the original. In an assembly which must be dissembled and reassembled periodically, this method requires that tools with different head sizes are needed. This is, at the very least inconvenient and may result in difficulty for those reassembling the device.

In order to replace the damaged thread with the same thread as the original assembly, it is necessary to bore the damaged threads out and replace the original threads with a thread-insert which can be threaded into the larger bored out and threaded hole and which has internal threads the same as the original threads. Such thread inserts are available, however the external threads of the thread-inserts are generally of conventional helical design. A conventional thread-insert has a tendency to become loose when the machine screw is removed for disassembly or, in some cases, the thread-insert will unscrew from the object when removal of the attaching screw is attempted thus complicating the disassembly process. In addition, if the attaching screw must provide a sealed engagement with the object, a conventional thread-insert will not usually provide a seal between its external threads and the wall of the object.

The following prior art reflects the state of the art of which applicant is aware and is included herewith to discharge applicant's acknowledged duty to disclose relevant prior art. It is stipulated, however, that none teaches or render obvious the nexus of the instant invention as disclosed in greater detail hereinafter and as particularly claimed.

| PATENT NO. | ISSUE DATE | INVENTOR |
| --- | --- | --- |
| 5,499,892 | March 19, 1996 | Reed |

SUMMARY OF THE INVENTION

The present invention has as its objective to provide thread-insert which will avoid the disadvantages noted above.

The present invention overcomes the disadvantages of the prior art noted above by first, providing a thread-insert which is fastened into a hole in the object using a thread design on the external surface of the insert and a matching thread formed in the bored out hole. The thread-insert has upwardly slanted thread surfaces that angle upward toward the head which lock the insert securely into the replacement hole of the object. The effect of these threads is to provide a radially inward clamping force as the insert is tightened, due to a clamping reaction of the threads vis-a-vis another part of the insert against the object receiving the insert. Secondly, the thread-insert has an internal thread preferably adapted to receive a desired standard threaded fastener. Thirdly, the thread-insert preferably includes a drive head that can include any of a variety of torque-receiving configurations. For instance, the drive head can have multiple facets dimensioned to be addressed by facets of a wrench. In addition, slots may be formed complementary to a slotted screw driver or other similar structures. Thus, the drive head receives torque and causes the thread repair insert to rotate about a central, long axis thereof. Below the drive head, the insert preferably includes a neck.

The thread-insert is provided with a pocket interposed between the neck and the upper surface of the upper most thread on the thread-insert. When the insert is threaded completely into the thread of the bored out hole, the insert deforms the metal of the thread from the object, forcing it into the pocket forming a tight seal between the insert and the wall of the object.

OBJECTS OF THE INVENTION

Accordingly, it is a primary object of the present invention to provide a thread-insert that upon tightening forms a tight-seal between the insert and the wall of an object.

A further object of the present invention is to provide a thread-insert which permits the same thread as the original undamaged threads so as to avoid the complexities of different size fasteners needed to assemble and disassemble an object or objects.

Another further object of the present invention is to provide a thread-insert that avoids the tendency to become loose when disassembly is required.

Another further object of the present invention is to provide a thread-insert that avoids the tendency to become loose when disassembly is required by providing exterior threads that are upwardly slanted thread surfaces that angle upward toward the head of the thread-insert and lock the insert securely into the replacement hole of the object.

A further of object of the present invention is to provide a thread-insert that has a pocket formed between the neck and the upper surface of the upper most thread wherein when the thread-insert is tightened, the metal of the object that constitutes the matching threads flows into the pocket thus creating a seal between the insert and the wall of the object.

Another further object of the present invention is to provide a thread-insert which includes having exterior threads and interior threads disposed thereon.

Another further object of the present invention is to provide a thread-insert which includes a drive head which is driveable by a commonly available torque-applying instrumentality.

Another further object of the present invention is to provide a thread-insert whereby the exterior threads preclude the thread-insert from disengaging from the threaded hole.

Another further object of the present invention is to provide a thread-insert which is designed to enter a complementary formed hole a finite distance.

Another further object of the present invention is to provide a thread-insert wherein the exterior threads are slightly spaced from each other and maintain a minimum thickness between a root and a crest thereof, providing a durable thread.

Another further object of the present invention is to provide a thread-insert which is simple and inexpensive to manufacture and yet durable in construction.

Viewed from a first vantage point it is a feature of the present invention to provide a method for providing a seal between a thread-insert and an object the thread-insert is inserted therein, comprising the steps of: boring a hole; cutting the top of the hole to match the shape of the thread-insert; tapping matching threads in the hole; threading the thread-insert into the hole until seated; and further threading the thread-insert into the hole to cause metal flow.

Viewed from a second vantage point it is a feature of the present invention to provide a thread-insert that forms a seal between itself and an object within which it is threaded. The thread-insert has a threaded shaft extending from a drive head along a central axis to a distal end; at least one of said shaft threads includes a crest defining a major diameter of said threaded shaft, a root defining a minor diameter of the threaded shaft, and an upper surface extending from a bottom edge of said root to an upper edge of the crest, wherein said upper surface having a portion thereof extending toward the crest at an angle greater that zero from a reference plane perpendicular to the central axis of said threaded shaft; and a pocket interposed between the upper most thread of the threaded shaft and the lower portion of the head.

Viewed from a third vantage point it is a feature of the present invention to provide a pocket portion of a thread-insert interposed between an upper most thread and a neck portion located under a drive head of the thread-insert, wherein the upper most thread and said neck portion are in a spaced relationship with a common central axis running therethrough, the neck being formed from an outer cylindrical surface of a diameter $d_1$. The pocket portion is defined by surfaces comprising: a relief surface that intersects the neck with the diameter of $d_1$ at an acute angle and intersects an inner cylindrical surface with a diameter of $d_2$, at the acute angle, wherein $d_1$ is greater than $d_2$ and the cylindrical surfaces are parallel to said common central axis of the thread-insert and concentric to each other; the inner cylindrical surface; and an upper surface at an angle relative to the common central axis of the upper most thread.

These and other objects will be made manifest when considering the following detailed specification when taken in conjunction with the appended drawing figures.

BRIEF DESCRIPTION OF THE DRAWINGS

Ten figures have been selected to demonstrate the present invention. These figures and the following description should be sufficient for those skilled in the art to practice the invention as claimed.

FIG. 2 is an enlarged section detail of the thread-insert.

FIG. 3 is a sectional view of an object having damaged threads.

FIG. 4 illustrates the first step of the method of using the thread-insert.

DESCRIPTION OF PREFERRED EMBODIMENTS

Figure 1A:
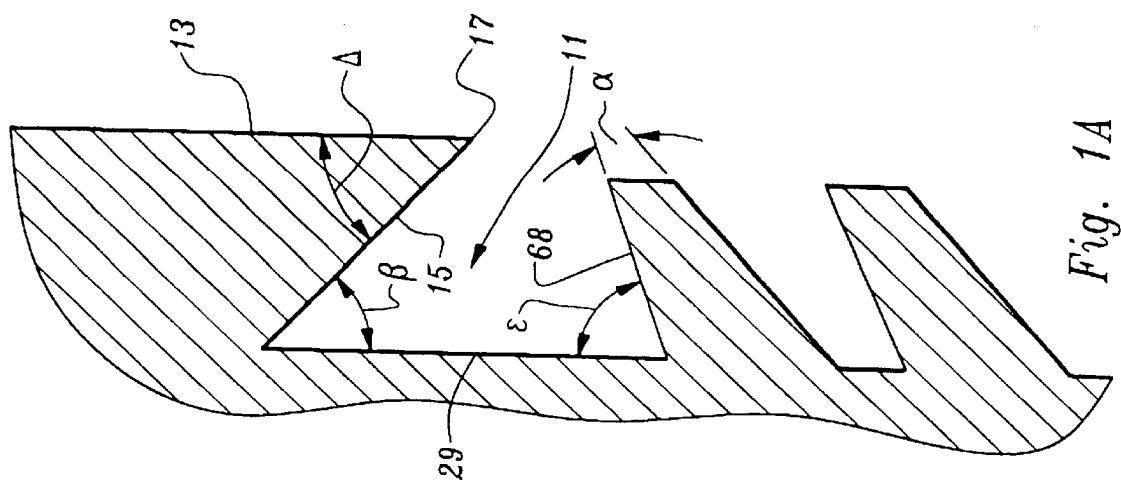
FIG. 1A is an enlarged section detailing the pocket.

Considering the drawings, wherein like reference numerals denote like parts throughout the various drawing figures, reference numeral 10 is directed to the preferred embodiment according to the present invention.

Figure 1:
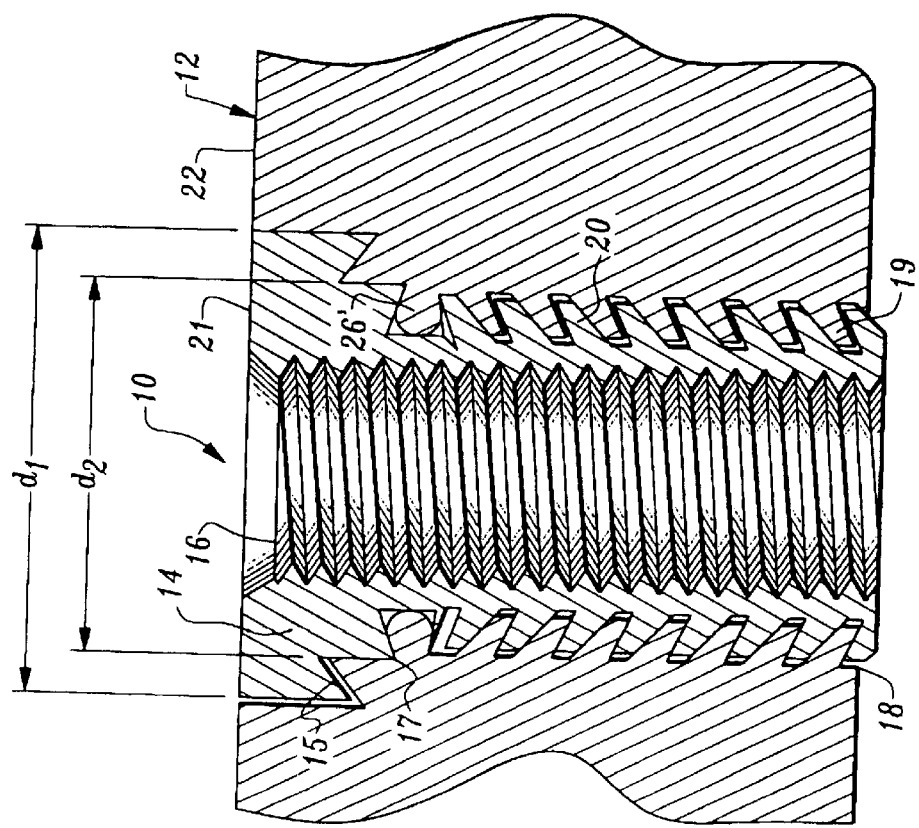
FIG. 1 is a sectional view of the thread-insert of the invention threaded into an object and provided with a threaded through hole.

Referring to FIG. 1, there is illustrated one preferred embodiment of the thread-insert 10 after it has been fully installed in an object 12 to replace damaged threads 32 (FIG. 3) in a hole in the object. The object 12 can be any device which requires threaded holes for assembly with a second part or for attaching other devices to the object. A hole 18 (FIG. 4) has been bored with a drill 34 into the object 12 and matching threads 19 (FIG. 6) have been cut into the wall of the hole 18.

The thread-insert 10 may be rotated into the threaded hole of the object until the top surface 21 of the thread-insert 10 is substantially flush with the upper surface of the object 12. If the top surface 21 projects above the object 12, it may be left as is or ground flush. As can be seen in FIG. 1A, a pocket 11 is defined by a neck 13 shaped as an outer cylindrical surface having a diameter $d_1$; a relief surface 15 that intersects neck 13 at a cusp 17 and at an angle delta (Δ). Cusp 17 is an active surface which causes deformation by crimping the object's material. In effect, cusp 17 reforms a top thread 26 of the hole 18 to be transformed into a locking ring 26'. Relief surface 15 intersects an inner cylindrical surface 29 having a diameter $d_2$. The angle between surface 15 and surface 29 is β, preferably an acute angle and preferably 80°. Note $d_1$ is greater than $d_2$. Neck 13 and inner cylinder surface 29 are parallel and concentric. The uppermost thread surface 68 intersects the inner cylindrical surface 29 at an angle epsilon (ε), preferably 90°. The pocket 11 formed by acute angle Δ, relief surface 15, inner cylindrical surface 29 and thread surface 68 forces the metal that forms the top thread 26 of the hole 18 to flow. This metal flow forms a locking ring seal 26' at the top of the threads of the thread-insert. The seal 26' forms a permanent fluid tight joint between the object 12 and the thread-insert 10.

An internal thread 16 preferably is of conventional design and is centrally formed in the body of the thread-insert 10 to replace the original damaged thread. The internal thread 16 preferably is centered about a long axis of the insert 10. The steps of this process are described in detail below in connection with the discussion of FIGS. 2 through 6.

Referring now to FIG. 2, there is shown an enlarged detail of the thread 20 on the exterior of the thread-insert 10. The threads are helically wound and include a crest 64 defining a major diameter 62 and a root 66 defining a minor diameter 60. The threads have an upper surface 68 which extends from the bottom edge 67 of the root 66 to the upper edge 69 of the crest 64. The threads 20 also include lower surface 70 which extends from the top edge 74 of the root 66 to the lower edge 76 of the crest 64. Both the upper surface 68 and the lower surface 70 angle upwards toward the top of the thread-insert. The crest 64 and the root 66 exhibit a constant distance from the central axis 63. The upper surface 68 extends from the root 66 at an upper surface angle alpha (α) diverging from a reference plane 65 orthogonal to the central axis 63. The upper surface angle α is preferably 20° but could be any angle between 0° and 90°. The lower surface 70 extends from the root 66 to the crest 64 at a lower surface angle beta (β) such that the thickness of the threads at the crests 64 is less than the thickness of the threads between adjacent roots. Thus the threads are provided with a greater thickness and hence greater strength adjacent the minor diameter 60 and are therefore capable of bearing the loads required to form the seal shown in FIG. 1.

Figures 5, 6:
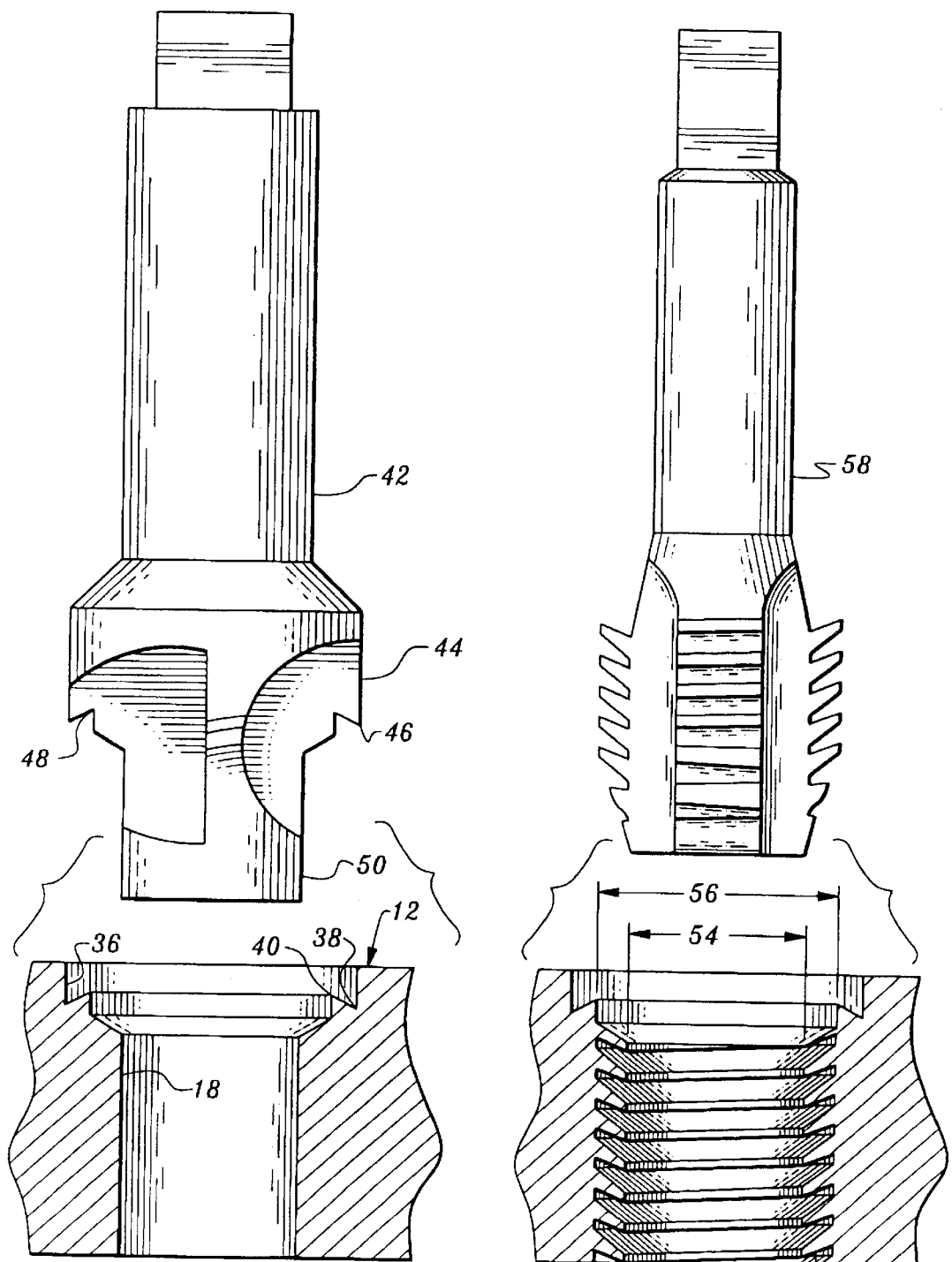
FIG. 5 illustrates the second step of preparing a hole in an object for using the thread-insert.
FIG. 6 illustrates the third step of preparing a hole in an object for using the thread-insert.

Referring now to FIGS. 3 through 7, the following is detailed description of the process of using the device of this invention. In FIG. 3, the object 12 is illustrated with its original threaded hole 30 in which the threads have been damaged as shown at 32. To replace this damaged thread with a threaded hole of the same size as the original thread, a new larger hole 18 is bored into the object 12 with drill 34 as shown in FIG. 4. In this illustration, the threaded hole is a through hole. The next step of the process is illustrated in FIG. 5. Here, the top of the hole 18 has been shaped by the cutter 42, to match the shape of the head of the thread-insert 10 as shown first in FIG. 1. The diameter 50 of the cutter 42 fits the diameter of the hole 18 and serves to center the cutter 42 in the hole 18. The cutting surface 44 forms the upper diameter 36 of the hole which matches the outer diameter of the head of the thread-insert 10. Surface 46 forms the stop surface 38 in the hole; surface 48 of the cutter forms the point 40 of the hole. FIG. 6 illustrates the tap 58 used to form the matching threads 19 in the hole 18. The tap 58 forms a matching thread 19 in the hole 18 having a major diameter 56 and a minor diameter 54 which respectively clear with the major diameter 62 and minor diameter 60 of the insert 10.

Figure 7B:
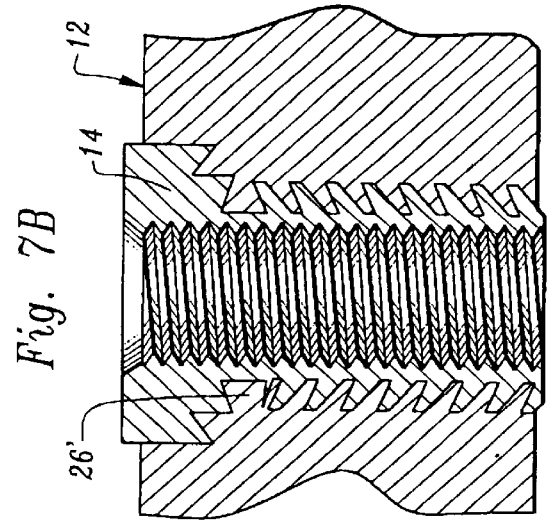
FIG. 7B illustrates the second step in installing the thread-insert.
Figure 7C:
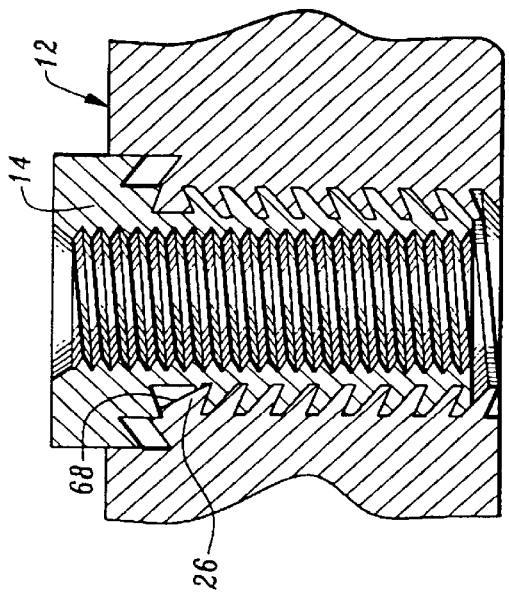
FIG. 7C illustrates the final step in installing the thread-insert.
Figure 7A:
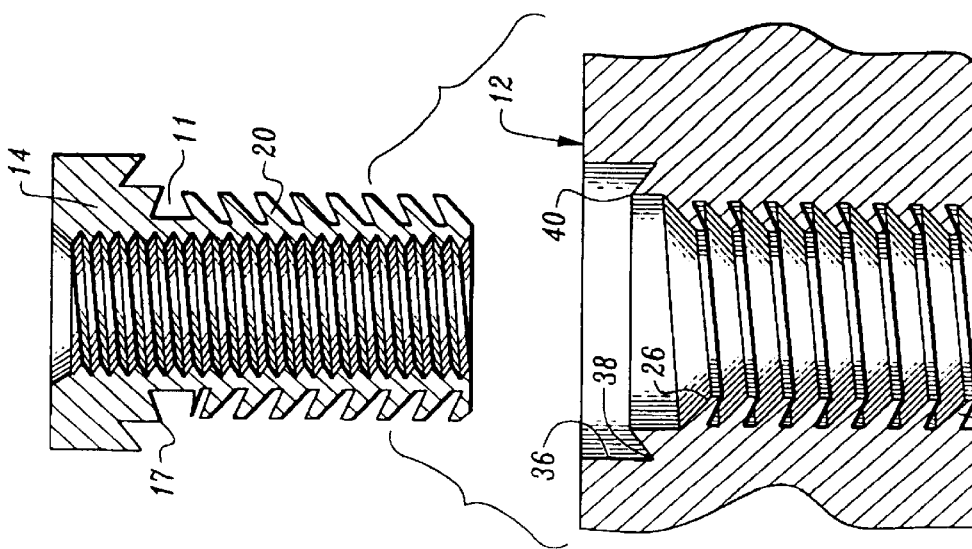
FIG. 7A illustrates the first step in installing the thread-insert.

Referring now to FIGS. 7A, 7B and 7C where the assembly of the thread replacement apparatus is illustrated. The hole 18 has been prepared as described above to accept the head 14 of the thread-insert 10 in the head receiving opening and the threaded portion 20 into the threads 19 of the hole 18. In FIG. 7A the thread-insert 10 is positioned above and centered on the hole 18. In FIG. 7B, the thread-insert 10 has been threaded part way into the hole 18 until the point 17 contacts the upper thread surface 68 of the top thread 26. As the thread-insert 10 is threaded further into the hole 18, the point 17 deforms the thread 26 causing metal flow into the pocket 11 of the thread-insert 10. The thread-insert 10 is further turned into the hole 18 until the top surface 21 of the thread-insert 10 is substantially flush with the upper surface 22 of the object 12. When the thread-insert 10 is fully threaded into the hole 18, the seal 26' is fully formed in the pocket 11 by distorting the top thread 26 as shown in FIGS. 1 and 1A. The thread-insert 10 is now permanently installed in the object.

Figure 8A:
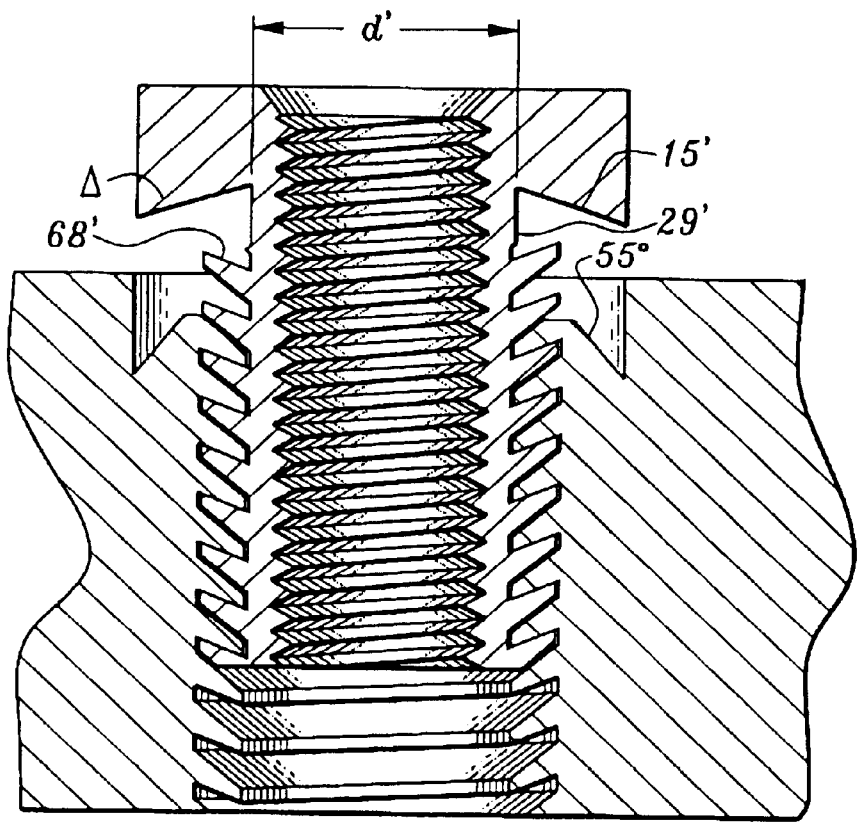
FIGS. 8A and 8B show a variation of FIG. 1.
Figure 8B:
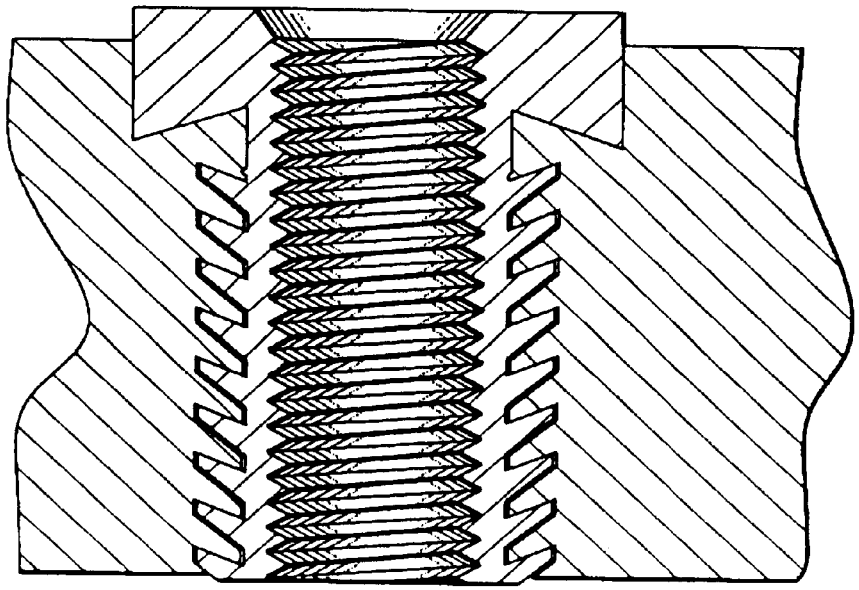

FIGS. 8A and 8B show a variation from FIGS. 1, 1A where the insert's included angle Δ is about 70° whereas in FIG. 1 and 1A it was 80°. The object includes an active surface having an included angle Δ preferably of 55°. When relief surface 15', surface 29' and topmost thread surface 68' are mated as shown in FIG. 8B. The metal flow makes a very good seal. Diameter d' of the surface 29' is preferable greater than the root 66 of the thread.

Moreover, having thus described the invention, it should be apparent that numerous structural modifications and adaptations may be resorted to without departing from the scope and fair meaning of the instant invention as set forth hereinabove and as described hereinbelow by the claims.

I claim:

1. A thread-insert that forms a seal between itself and a threaded bore in an object it is threaded therein, comprising:
   a threaded shaft extending from a drive head along a central axis to a distal end;
   at least one of said shaft threads includes a crest defining a major diameter of said threaded shaft, a root defining a minor diameter of said threaded shaft, and an upper surface extending from a bottom edge of said root to an upper edge of said crest, wherein said upper surface having a portion thereof extending toward said crest at an angle greater than zero from a reference plane perpendicular to said central axis of said threaded shaft; and
   a pocket interposed between the upper most thread of said threaded shaft and the lower portion of said head.

2. The thread-insert of claim 1 wherein said pocket includes a cusp formed on said lower portion of said head, said cusp causing deformation in said object.

3. The thread-insert of claim 2 wherein said cusp is formed by a relief surface that intersects a neck portion under said drive head, said drive head with said diameter of $d_1$, at an acute angle, and intersects an inner cylindrical surface with a diameter of $d_2$, at said acute angle, wherein $d_1$ is greater than $d_2$ and said cylindrical surfaces are parallel to said central axis of said thread-insert and concentric to each other.

4. The thread-insert of claim 3 wherein said pocket includes an upper thread surface of said upper most thread of said threaded shaft.

5. The thread-insert of claim 4 wherein said upper thread surface contacts said inner cylindrical surface at a 90° angle.

6. The thread-insert of claim 5 wherein said cusp exhibits an included angle of 55° relative to said central axis.

7. A pocket portion of a thread-insert interposed between an upper most thread and a neck portion located under a drive head of said thread-insert, wherein said upper most thread and said neck portion are in a spaced relationship with a common central axis running therethrough, said neck portion being formed from an outer cylindrical surface of a diameter $d_1$, said pocket portion defined by surfaces comprising:
   a relief surface that intersects said neck portion with said diameter of $d_1$ at an acute angle and intersects an inner cylindrical surface with a diameter of $d_2$, at said acute angle, wherein $d_1$ is greater than $d_2$ and said cylindrical surfaces are parallel to said common central axis of said thread-insert and concentric to each other;
   said inner cylindrical surface; and
   an upper thread surface at an angle relative to said common central axis of said upper most thread.

8. The pocket portion of claim 7 wherein the intersection of said relief surface with said diameter of $d_1$ at an acute angle creates a cusp at said diameter $d_1$ defining an annular cutting ring of diameter $d_1$, concentric to said inner cylindrical surface of said diameter $d_2$, said cutting ring to deform the material of said object, forming a seal thereby.

9. The pocket portion of claim 8 wherein said angle of said upper thread surface of said upper most thread is 90°.

10. The pocket portion of claim 9 wherein said acute angle of said relief surface is 55°.

11. The pocket portion of claim 10 wherein said drive head and said neck portion of the thread-insert exhibit an outer cylindrical surface of diameter $d_1$, and only one inner cylindrical surface of diameter $d_2$ less than $d_1$.

12. The pocket portion of claim 10 wherein said drive head and said neck portion of the thread-insert exhibit a plurality of cylindrical diameters $d_n$, said plurality of diameters $d_n$ of a magnitude between $d_1$ and $d_2$.

13. A thread-insert that forms a seal between itself and a threaded bore in an object it is threaded therein, comprising:
   a threaded shaft having first and second ends;
   a drive head at said first end of said threaded shaft, the diameter of a portion of said drive head defining an outer diameter, said outer diameter greater than any diameter of said threaded shaft; and
   a relief surface extending from said threaded shaft and intersecting said outer diameter at an acute angle, defining a cusp, said cusp causing deformation in said object.

14. The thread-insert of claim 13 wherein said outer cylindrical diameter is defined by an intermediate diameter of said drive head, said intermediate diameter greater than said diameter of said shaft, but less than the maximum diameter of said drive head.

15. The thread-insert of claim 13 wherein said outer diameter is defined by the maximum diameter of said drive head.

16. The thread-insert of claim 15 wherein the upper surface of the thread nearest said drive head contacts said shaft at a 90° angle.

17. The thread-insert of claim 15 wherein the upper surface of the thread nearest said drive head contacts said shaft at an angle less than 90°.

18. The thread-insert of claim 15 wherein the upper surface of the thread nearest said drive head contacts said shaft at a 90° angle.

19. The thread-insert of claim 15 wherein the upper surface of the thread nearest said drive head contacts said shaft at an angle less than 90°.

20. The thread-insert of claim 13 wherein said outer diameter is defined by an intermediate diameter of said drive head, said intermediate diameter greater than said diameter of said threaded shaft, but less than the maximum diameter of said drive head.

21. The thread-insert of claim 20 wherein the upper surface of the thread nearest said drive head contacts said shaft at a 90° angle.

22. The thread-insert of claim 20 wherein the upper surface of the thread nearest said drive head contacts said shaft at an angle less than 90°.

23. The thread-insert of claim 20 wherein the upper surface of the thread nearest said drive head contacts said shaft at a 90° angle.

24. The thread-insert of claim 20 wherein the upper surface of the thread nearest said drive head contacts said shaft at an angle less than 90°.

25. A thread-insert that forms a seal between itself and a threaded bore in an object it is threaded therein, comprising:
   a shaft having first and second ends, the diameter of said shaft defining an inner cylindrical diameter;
   a drive head at said first end of said shaft, a diameter of said drive head defining an outer cylindrical diameter, said outer cylindrical diameter greater than said inner cylindrical diameter;
   a threaded portion of said shaft, beginning below said drive head and extending to said second end of said shaft; and
   a cusp between said drive head and said threaded portion, said cusp formed by the intersection of a relief surface, outwardly projecting from said inner cylindrical diameter, and said outer cylindrical diameter at an acute angle, and said cusp defining a cutting ring to deform the material of said object just outboard of the threaded bore.

26. The thread-insert of claim 22 wherein said outer cylindrical diameter is defined by the maximum diameter of said drive head.

27. A thread-insert that forms a seal between itself and a threaded bore in an object it is threaded therein, comprising:
   a threaded shaft having a drive head at one end, said threaded shaft being hollow along its long axis and provided with interior threads,
   cusp means on the underside of said drive head, said cusp means to deform the material of said object to cause metal flow.

28. The thread-insert of claim 27 wherein a pocket is formed under said drive head between said cusp and the surface of the thread nearest said drive head, and wherein said interior threads conform to an internal thread of the threaded bore.

29. The thread-insert of claim 28 wherein the surface of the thread nearest said drive head contacts said shaft at a 90° angle.

30. A method for providing a seal between a thread-insert and an object said thread-insert is inserted therein, comprising the steps of:
   boring a hole;
   cutting the top of the hole to match the shape of the thread-insert;
   tapping matching threads in the hole, thereby forming a threaded bore;
   threading the thread-insert into the threaded bore until seated; and
   further threading the thread-insert into the threaded bore to cause metal flow.

31. The method of claim 1 further including the step of deforming said object by said metal flow until a liquid-tight seal is attained.

32. A method for forming a seal between a thread-insert and a threaded bore in an object it is inserted therein, the steps including:
   boring a hole;
   cutting the top of the hole to match the shape of the thread-insert;
   tapping matching threads in the hole, thereby forming a threaded bore;
   seating the thread-insert in the threaded bore; and
   causing metal flow in the threaded bore by deforming said object, said metal flow produced by action of a cutting ring formed by a cusp on an outer diameter of a head portion of said thread-insert.

33. A method for repairing a damaged threaded bore in an object using a thread insert, the steps including:
   drilling out said damaged threaded bore, thereby providing a hole of greater diameter than said damaged threaded bore;
   cutting the top of said hole to match the shape of the thread-insert;
   tapping threads to receive the thread-insert in the hole, thereby forming a secondary threaded bore;
   threading the thread-insert into the secondary threaded bore until seated;
   further threading the thread-insert into the secondary threaded bore causing metal flow, thereby forming a seal between the thread-insert and the secondary threaded bore; and
   tapping threads matching the threads of said damaged threaded bore in the thread-insert.

* * * * *